United States Patent
Varatharajan et al.

(10) Patent No.: US 11,903,027 B2
(45) Date of Patent: Feb. 13, 2024

(54) SYSTEMS AND METHODS FOR REDUCING OCCURRENCE OF DATA COLLISIONS IN WIRELESS NETWORKS

(71) Applicant: Apple Inc., Cupertino, CA (US)

(72) Inventors: Sarvesh Kumar Varatharajan, Sunnyvale, CA (US); Arun Vijayakumari Mahasenan, Fremont, CA (US); Venkateswara Rao Manepalli, San Jose, CA (US); Won Soo Kim, Cupertino, CA (US); Yaranama Venkata Ramana Dass, Belmont, CA (US); Giri Prassad Deivasigamani, Cupertino, CA (US); Anil G Naik, San Jose, CA (US); Piyush Kumar Upadhyay, San Jose, CA (US)

(73) Assignee: Apple Inc., Cupertino, CA (US)

( * ) Notice: Subject to any disclaimer, the term of this patent is extended or adjusted under 35 U.S.C. 154(b) by 37 days.

(21) Appl. No.: 17/697,778

(22) Filed: Mar. 17, 2022

(65) Prior Publication Data
US 2023/0199841 A1    Jun. 22, 2023

Related U.S. Application Data

(60) Provisional application No. 63/291,126, filed on Dec. 17, 2021.

(51) Int. Cl.
*H04W 74/08* (2009.01)
(52) U.S. Cl.
CPC .............................. *H04W 74/0816* (2013.01)

(58) Field of Classification Search
CPC ................................................. H04W 74/0816
See application file for complete search history.

(56) References Cited

U.S. PATENT DOCUMENTS

| 8,107,989 B2 | 1/2012 | Budampati et al. |
| 10,244,536 B1 * | 3/2019 | Jiang ..................... H04W 24/08 |
| 10,285,202 B2 | 5/2019 | Chu et al. |
| 11,166,315 B2 | 11/2021 | Guo et al. |

(Continued)

OTHER PUBLICATIONS

IEEE Std 802.15.4-2020: "IEEE Standard for Low-Rate Wireless Networks" (Year: 2020).*

*Primary Examiner* — James P Duffy
(74) *Attorney, Agent, or Firm* — FLETCHER YODER PC

(57) ABSTRACT

The present disclosure relates to several techniques for reducing the occurrence of data collisions, which can occur when multiple devices simultaneously transmit data in the same (frequency) channel. For example, a turnaround time in which a device switches from a receive mode of operation to a transmit mode of operation may be reduced based on the device and another device indicating that they are capable of operating with a reduced turnaround. As another example, devices may use learning-based turnaround estimation to determine a turnaround time supported by other devices and utilize the determined turnaround time, for instance, instead of a longer turnaround time. As yet another example, multiple clear channel assessments may be performed before transmitting data. For instance, a first clear channel assessment may be performed during a backoff period, and a second clear channel assessment may be performed afterwards before data is transmitted.

20 Claims, 10 Drawing Sheets

(56) References Cited

U.S. PATENT DOCUMENTS

| | | | |
|---|---|---|---|
| 2009/0262709 A1* | 10/2009 | Mason | H04W 36/06 |
| | | | 370/336 |
| 2011/0140851 A1* | 6/2011 | Lee | H04W 52/0235 |
| | | | 340/9.1 |
| 2015/0100618 A1* | 4/2015 | Le Guen | H04L 65/1036 |
| | | | 709/201 |
| 2017/0079068 A1* | 3/2017 | Ahmed | H04W 74/0816 |
| 2020/0275487 A1 | 8/2020 | Huang | |

* cited by examiner

SYSTEMS AND METHODS FOR REDUCING OCCURRENCE OF DATA COLLISIONS IN WIRELESS NETWORKS

CROSS-REFERENCE TO RELATED APPLICATIONS

This application claims priority to and the benefit of U.S. Provisional Application No. 63/291,126, filed Dec. 17, 2021, and entitled, "SYSTEMS AND METHODS FOR REDUCING OCCURRENCE OF DATA COLLISIONS IN WIRELESS NETWORKS," which is incorporated herein by reference in its entirety for all purposes.

BACKGROUND

The present disclosure relates generally to wireless communication, and more specifically to the operation of transmitters and receivers in wireless communication devices associated with wireless communication.

In an electronic device, a transmitter and a receiver may each be coupled to an antenna to enable the electronic device to both transmit and receive wireless signals. Electronic devices may communicate wirelessly in several types of networks and in accordance with several standards. One such type of network is a low-rate wireless personal area network (LR-WPANs), whose operation is defined in Institute of Electrical and Electronics Engineers (IEEE) Standard 802.15.4 (also known as "IEEE Standard for Low-Rate Wireless Networks"). IEEE Standard 802.15.4 provides the basis for several networking specifications, such as Zigbee, WirelessHART, 6LoWPAN, Thread, and SNAP.

One of the features of IEEE Standard 802.15.4 is carrier-sense multiple access with collision avoidance (CSMA/CA), which allows several devices connected to the same communication channel (e.g., a channel having a particular frequency or range of frequencies) to share the channel while also trying to avoid data collisions. A data collision occurs when multiple devices transmit data (e.g., data packets) simultaneously. When a data collision occurs, the transmitted data may often become corrupted, and, in response, the packets that were transmitted may typically be retransmitted at a later time. Because data may be retransmitted, data collisions may lower network performance (e.g., because the time used for retransmitting data could have been used to send new data had the collision not occurred). In the CSMA/CA described in IEEE Standard 802.15.4, devices (which can also be called "nodes") connected to a network try to avoid collisions by beginning to transmit data after a channel is sensed as being idle. For example, to determine whether a channel is idle (e.g., available for transmitting data), a device may perform a clear channel assessment (CCA). If the clear channel assessment indicates that the channel is idle, the device may transmit data. However, if the clear channel assessment indicates that the channel is busy (e.g., because another device is currently transmitting data), the device may wait for a backoff time, which may be a random amount of time. In IEEE Standard 802.15.4, a clear channel assessment has a duration of 128 microseconds (μs) (for non-beacon modes of operation).

Bearing this in mind, devices may also send an acknowledgement (ACK) in response to receiving data. For example a when a first device receives data from a second device, the first device may send an acknowledgement to the second device to indicate that the first device received the data sent by the second device. More specifically, first device may switch from operating in a receive mode to operating in a transmit mode, which may take a duration of time known as a "turnaround time." In IEEE Standard 802.15.4, the turnaround time is a defined as having a duration of 192 μs. After the turnaround time has elapsed (during which the first device has switched to the transmit mode of operation), the first device may transmit the acknowledgment (e.g., without performing a clear channel assessment). In some cases, the acknowledgement may be sent while another device on the network is transmitting data, thereby causing the data and acknowledgement to be corrupted. In other words, there may be a data collision between data being transmitted by one device and an acknowledgement sent by another device. This means that the data from both devices may need to be retransmitted at a later time, which may negatively impact the performance of the network.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to several techniques for reducing the occurrence of data collisions, which can occur when multiple devices simultaneously transmit data in the same channel (e.g., frequency range). For example, a turnaround time in which a device switches from a receive mode of operation to a transmit mode of operation may be reduced based on the device and another device indicating that they are capable of operating with a reduced turnaround. As another example, devices may use learning-based turnaround estimation to determine a turnaround time supported by other devices and utilize the determined turnaround time, for instance, instead of a longer turnaround time. As yet another example, multiple clear channel assessments may be performed before transmitting data. For instance, a first clear channel assessment may be performed during a backoff period, and a second clear channel assessment may be performed afterwards before data is transmitted.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
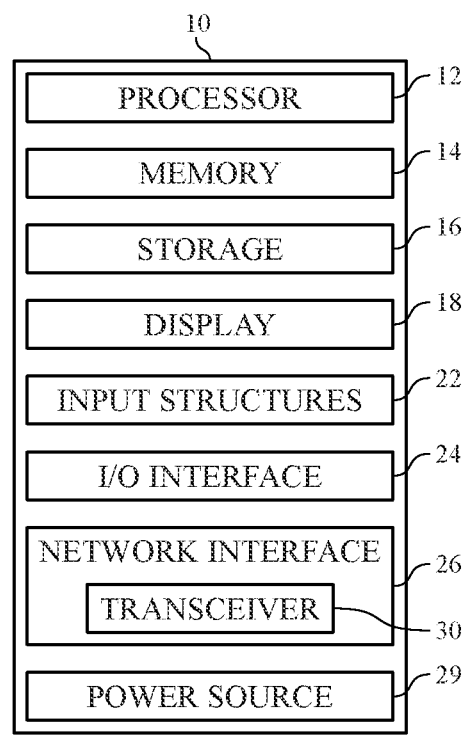
FIG. 1 is a block diagram of an electronic device, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

This disclosure is directed to avoiding data collisions among nodes (e.g., devices) in a wireless network, including IEEE Standard 802.15.4 networks. For example, a turnaround time in which a device switches from a receive mode of operation to a transmit mode of operation may be reduced based on the device and another device indicating that they are capable of operating with a reduced turnaround. As another example, devices may use learning-based turnaround estimation to determine a turnaround time supported by other devices and utilize the determined turnaround time, for instance, instead of a longer turnaround time. As yet another example, multiple clear channel assessments may be performed before transmitting data. For instance, a first clear channel assessment may be performed during a backoff period, and a second clear channel assessment may be performed afterwards before data is transmitted.

Keeping the foregoing in mind, FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), a smart speaker, home automation equipment (including, but not limited to switches, outlets, controllers, irrigation or sprinkler system equipment, sensors, lights, thermostats), wireless (or wired) routers, network extenders, or power equipment (e.g., controllers, power storage devices, solar panels)), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as a LR-WPAN or an ultra-wideband (UWB) or a BLUETOOTH® network, a local area network (LAN) or wireless local area network (WLAN), such as a network employing one of IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite network, a non-terrestrial network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the electronic device 10 may include any suitable source of power, such as a rechargeable lithium polymer (Li-poly) battery and/or an alternating current (AC) power converter.

Figure 2:
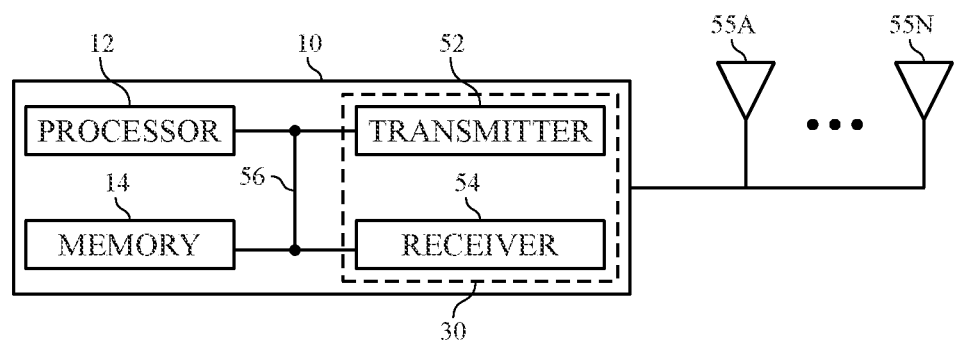
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and an external device via, for example, a network (e.g., including base stations) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
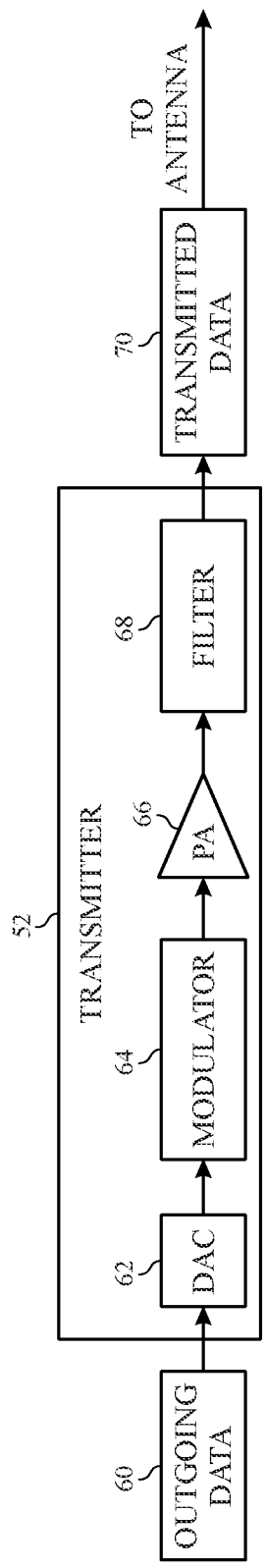
FIG. 3 is a schematic diagram of a transmitter of the electronic device of FIG. 1, according to embodiments of the present disclosure.

FIG. 3 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55. A filter 68 (e.g., filter circuitry and/or software) of the transmitter 52 may then remove undesirable noise from the amplified signal to generate transmitted data 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary).

Figure 4:
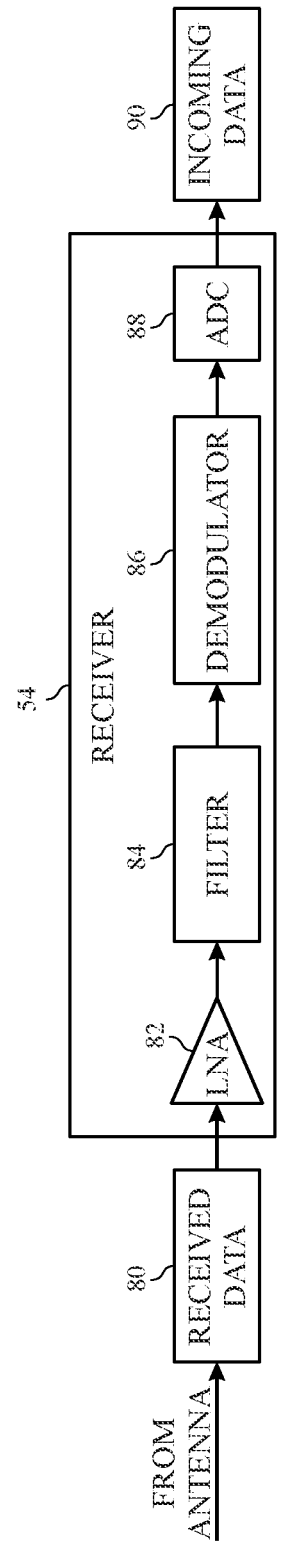
FIG. 4 is a schematic diagram of a receiver of the electronic device of FIG. 1, according to y embodiments of the present disclosure.

FIG. 4 is a schematic diagram of the receiver 54 (e.g., receive circuitry), according to embodiments of the present disclosure. As illustrated, the receiver 54 may receive received data 80 from the one or more antennas 55 in the form of an analog signal. A low noise amplifier (LNA) 82 may amplify the received analog signal to a suitable level for the receiver 54 to process. A filter 84 (e.g., filter circuitry and/or software) may remove undesired noise from the received signal, such as cross-channel interference. The filter 84 may also remove additional signals received by the one or more antennas 55 that are at frequencies other than the desired signal. The filter 84 may include any suitable filter or filters to remove the undesired noise or signals from the received signal, such as a bandpass filter, a bandstop filter, a low pass filter, a high pass filter, and/or a decimation filter. A demodulator 86 may remove a radio frequency envelope and/or extract a demodulated signal from the filtered signal for processing. An analog-to-digital converter (ADC) 88 may receive the demodulated analog signal and convert the signal to a digital signal of incoming data 90 to be further processed by the electronic device 10. Additionally, the receiver 54 may include any suitable additional components not shown, or may not include certain of the illustrated components, such that the receiver 54 may receive the received data 80 via the one or more antennas 55. For example, the receiver 54 may include a mixer and/or a digital down converter.

Figure 5:
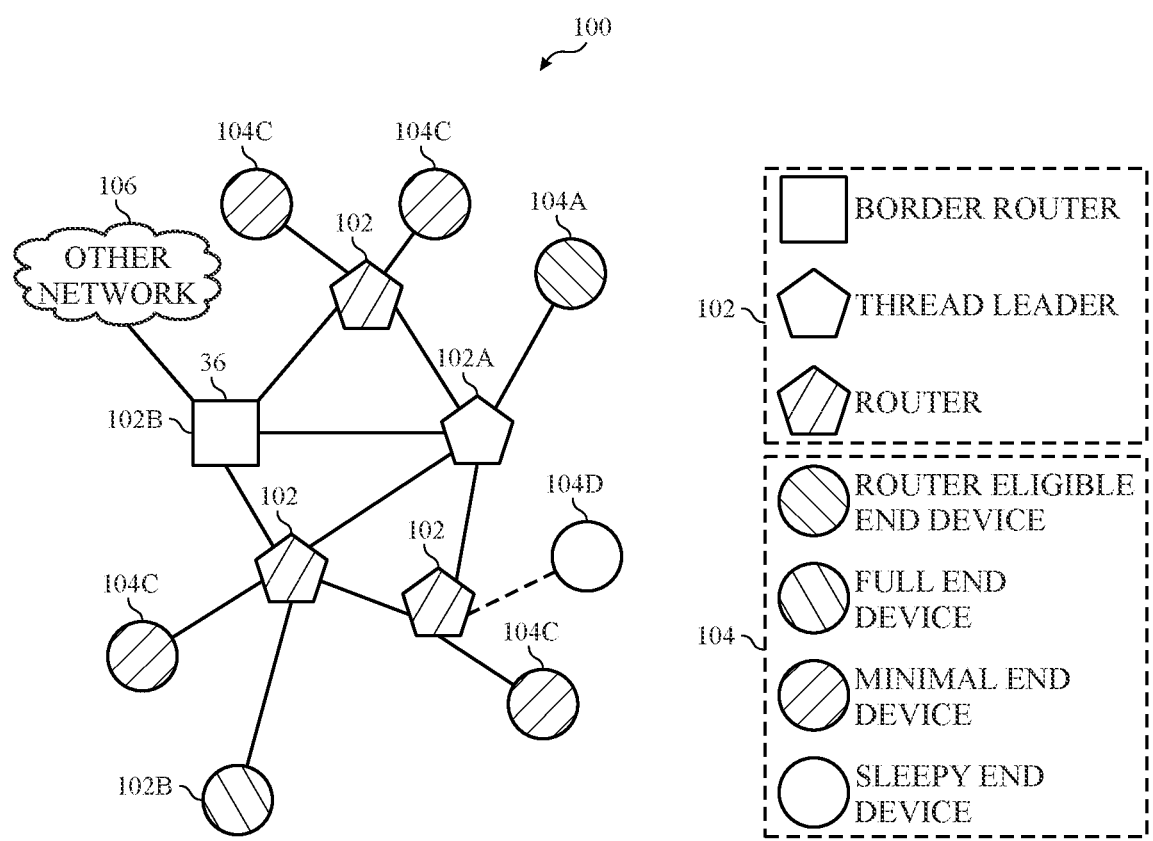
FIG. 5 is a schematic diagram of an IEEE Standard 802.15.4-based Thread network that may include the electronic device of FIG. 1 as a node, according to embodiments of the present disclosure.

FIG. 5 is a schematic diagram of a wireless network 100 in which the electronic device may be connected. In particular, the wireless network 100 is a LR-WPAN, and, even more particularly, a Thread network. While the techniques described herein may be described with respect to the Thread network, it should be noted that the techniques may be utilized with other types of wireless networks, including, but not necessarily limited to, any IEEE Standard 802.15.4 network.

The wireless network 100 includes several nodes (e.g., routers 102 and end devices 104) that are connected to one another as illustrated in FIG. 5. Each of the nodes is an electronic device included in the wireless network 100. As illustrated, there are several types of nodes in the wireless network 100. Depending on what particular device the electronic device 10 is (or the capabilities of the electronic device 10), the electronic device 10 may be one or more of any of the types of nodes. The particular types of nodes included in the wireless network 100 include routers 102 (collectively referring to routers 102 (e.g., routers that are not further classified as discussed below), thread leader 102A, and border router 102B) and end devices 104 (collectively referring to end devices 104A, 104B, 104C, 104D). Routers 102 are nodes that forward packets for network devices, provide secure commissioning services for devices attempting to join the wireless network 100, and keep their transceiver(s) enabled at all times. End devices 104 are nodes that do not forward packets for other network devices, communicate (primarily) with a single router 102, and may disable their transceiver(s) to reduce power. As discussed below, routers 102 and some end devices 104 may also be classified as full Thread devices, while other end devices may be classified as minimal Thread devices. A full Thread device may always have its radio on, maintain IPv6 address mappings, and subscribe to an all-routers multicast address. Minimal Thread devices may not subscribe to the all-routers multicast address and forward their messages to a router 102 (or an end device 104 that is functioning as a router 102).

Within the classification of routers 102, there may be several types of routers 102. For example, a router 102 may be a thread leader 102A, which manages the other routers in the wireless network 100. A router 102 may also be a border router 102B, which is a device that can forward data to another network 106, such as a network other than a Thread network (e.g., a Wi-Fi® network). Routers 102 are full Thread devices.

Within the classification of end devices 104, there are router eligible end devices 104A, full end devices 104B, minimal end devices 104C, and sleepy end devices 104D. Router eligible end devices 104A and full end devices 104B are full Thread devices. More specifically, router eligible end devices 104A are end devices 104 that can be promoted to function as a router 102, while full end devices 104B are end devices 104 that are full Thread devices but cannot be promoted to be a router 102. Minimal end devices 104C and sleepy end devices 104D are minimal Thread devices. In particular, a minimal end device 104C does not need to poll for messages sent from the router 102 to which the minimal end device 104C is connected, and the minimal end device's 104C transceiver is always on. A sleepy end device 104D is an end device 104 that is typically in sleep and wakes up occasionally to poll for messages from the router 102 to which it is connected.

The wireless network 100 may be implemented indoors (e.g., within a dwelling or office space), outdoors, or both. The nodes may include electrical devices including, but not limited to, the electronic devices listed above that the electronic device 10 may be. For instance, the nodes (which include the electronic device 10) may be a phone, tablet, computer, a portable electronic or handheld electronic, a wearable electronic device, a smart speaker, home automation equipment (including, but not limited to switches, outlets, controllers, irrigation or sprinkler system equipment, sensors, lights, thermostats), wireless routers, network extenders, or power equipment), or any combination thereof.

Data Collision Avoidance Using Reduced Turnaround Times

Figure 6:
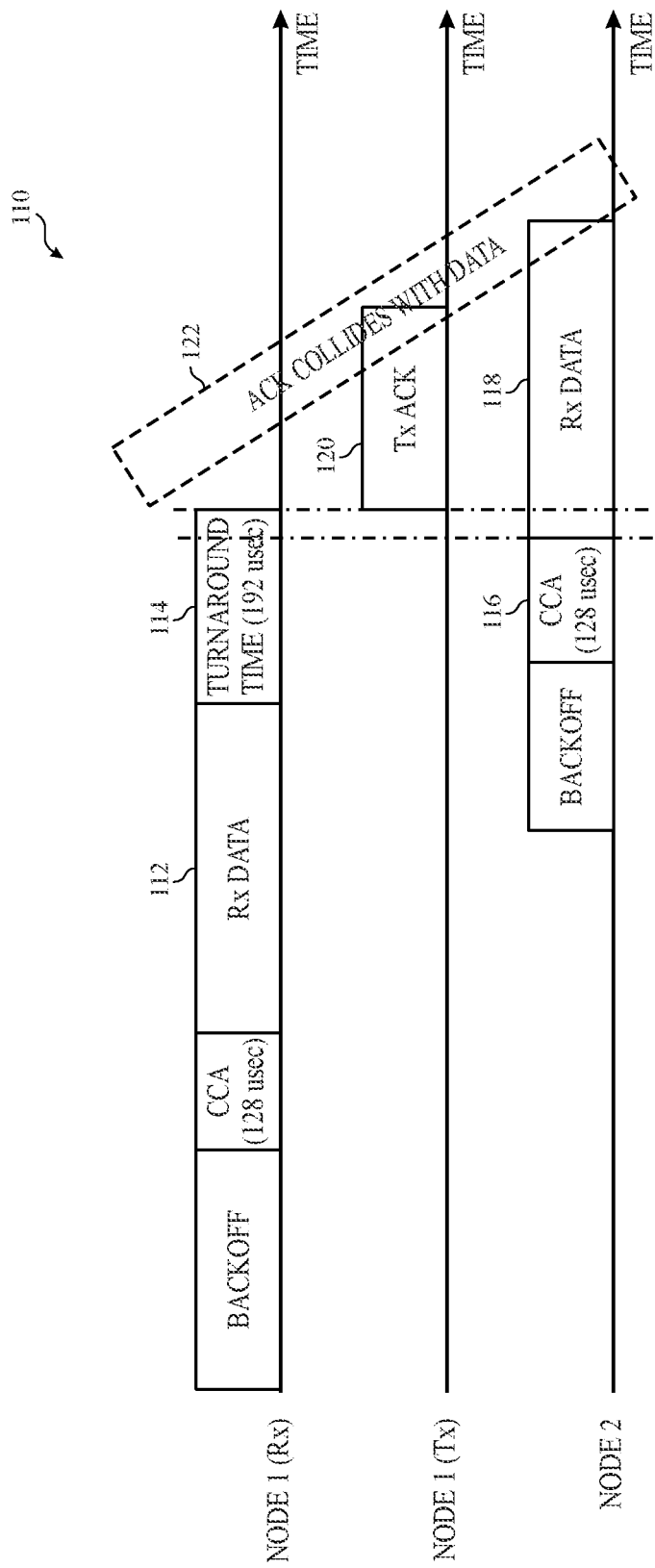
FIG. 6 is timing diagram of actions taken by two nodes in a wireless network that results in a data collision, according to embodiments of the present disclosure.

The present disclosure relates to techniques for reducing (or preventing) the occurrence of data collisions, including data collisions that may occur between nodes of wireless network 100. Bearing this in mind, FIG. 6 is a timing diagram 110 depicting actions taken by two nodes (e.g., nodes within the wireless network 100) over time. More specifically, the timing diagram 110 includes actions taken by a receiver (Rx) of a first node (i.e., Node 1), a transmitter (Tx) of the first node, and a second node (i.e., Node 2). As illustrated (and indicated by "Rx Data" 112), the receiver of the first node receives data and, during a turnaround time 114, switches from operating in a receive mode to operating in a transmit mode (e.g., by deactivating the receiving and activating the transmitter). As described above, the turnaround time (e.g., turnaround time 114) may be a defined duration of time, such as 192 µs as defined by IEEE Standard 802.15.4. During the turnaround time 114, the second node performs a clear channel assessment ("CCA") 116 for a channel of the wireless network 100, which indicates that the channel is idle, meaning the channel is available to be used to transmit data. The second node begins transmitting data (as indicated by "Tx Data" 118) during the turnaround time. However, while the second node is transmitting data, the turnaround time ends 114, and the transmitter of the first node begins to transmit an acknowledgement (indicated by "Tx ACK" 120). Thus, a data collision (indicated by collision 122) occurs because the first and second nodes are simultaneously or concurrently transmitting data (e.g., on the same channel).

Figure 7:
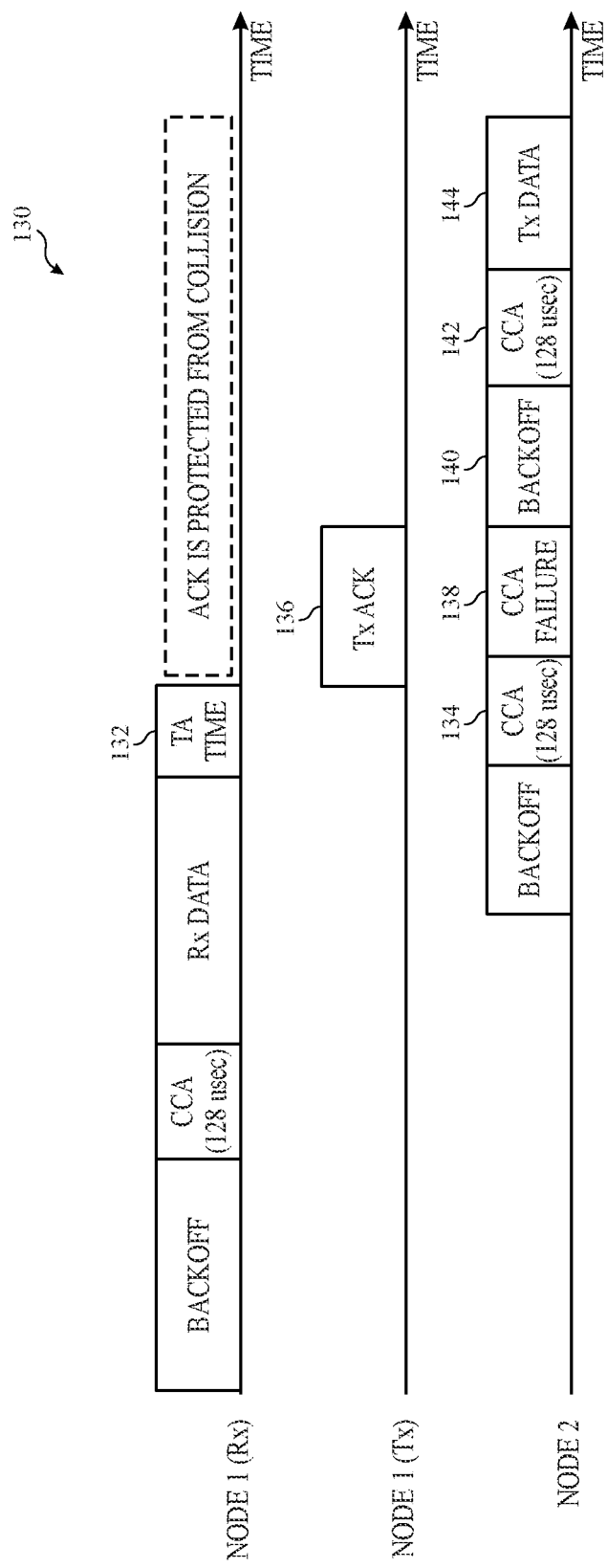
FIG. 7 is a timing diagram of actions taken by two nodes in a wireless network to reduce or prevent the occurrence of data collisions, according to embodiments of the present disclosure.

To help reduce or eliminate the occurrence of data collisions, as shown in timing diagram 130 of FIG. 7, the turnaround time (e.g., turnaround time 132) may be reduced from the duration defined by IEEE Standard 802.15.4. For example, the turnaround time 132 may be shortened to be equal to or less than the duration of the clear channel assessment (e.g., CCA 134). In other words, the turnaround time 132 may be reduced to 128 µs or an amount of time that is less than 128 µs (e.g., 100 µs). As shown in FIG. 7, and in contrast to FIG. 6, because the turnaround time 132 ends before the clear channel assessment 134 finishes, the first node has already begun transmitting an acknowledgement 136, and the result of the clear channel assessment 134 indicates that the channel is not idle (indicated by "CCA Failure" 138). After a backoff period 140 ends, the second node performs another clear channel assessment 142 that indicates that the channel is idle. Afterwards, the second node transmits data (indicated by "Tx Data" 144). Accordingly, by shortening the turnaround time, the acknowledgement and data are not transmitted simultaneously, thereby protecting the acknowledgement from being corrupted by a data collision. In other words, a node may more quickly perform a switch between a receiver mode and a transmit mode to reduce or eliminate the occurrence of data collisions.

As discussed below, several techniques may be utilized to reduce the turnaround time of electronic devices (e.g., nodes in the wireless network 100). In a first technique, devices may communicate to one another that they are capable of operating with a reduced turnaround time. More specifically, while some devices may be incapable of operating with a reduced turnaround time, a device may determine that a device it is communicating with is capable of operating using a reduced turnaround time based on receiving data indicating so. Additionally, the device may have sent a similar indication to the other device. Accordingly, when both devices have indicated that they can operate using a reduced turnaround time, the devices may both reduce their turnaround times, thereby reducing the occurrence of data collisions involving the two devices.

Figure 8:
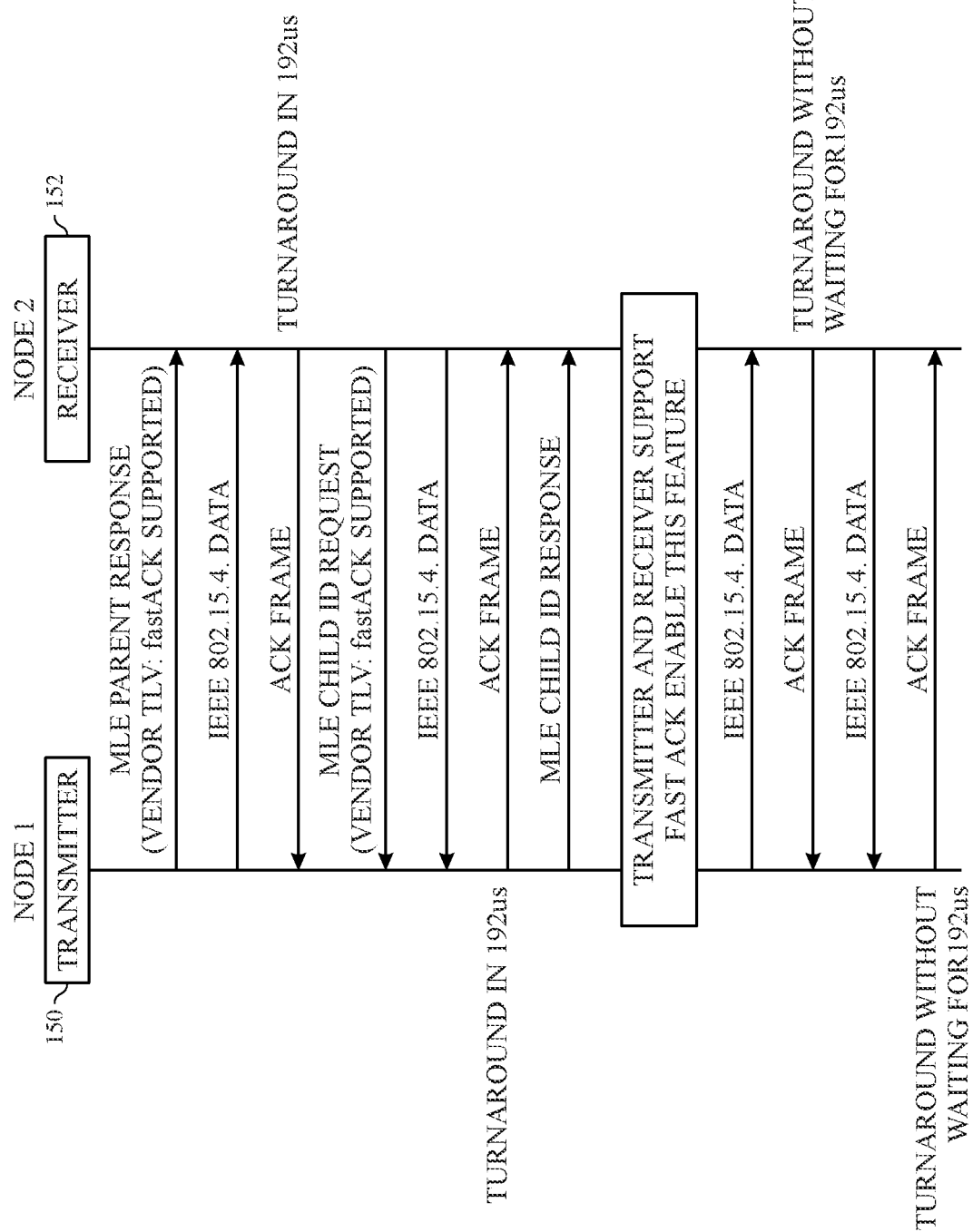
FIG. 8 is a chart illustrating two nodes of the wireless network of FIG. 5 each providing an indication that it can operate with a reduced turnaround time to the other node, according to embodiments of the present disclosure.

Bearing this in mind, FIG. 8 is a chart illustrating communication between two nodes (e.g., electronic devices) that may be communicatively coupled to one another in a wireless network (e.g., wireless network 100) and employing the technique discussed above in which nodes can acknowledge whether they can operate with a reduced turnaround time. For example, a first node 150 may be a router in the wireless network 100, while a second node 152 may be an end device in the wireless network 100. As illustrated, the first node 150 transmits a mesh link establishment (MLE) parent response to the second node. The MLE parent response may be used to establish a parent-child relationship between the first node 150 and the second node 152 in which the first node 150 will serve as the parent and the second node 152 will be the child. In other words, the MLE parent response may be used to establish a connection between the first node 150 and the second node 152 in the wireless network 100 in which the first node 150 will be the router for the second node 152. As part of the MLE parent response, the first node 150 may include data (e.g., capability or configuration data) indicating that the first node 150 supports a shortened turnaround time (e.g., "fastACK supported"). Additionally, the first node 150 may send other data (indicated as "IEEE 802.15.4 Data"), such as other capability or configuration data or payload data.

The second node 152 may receive the MLE parent response and data at its receiver, switch from a receive mode of operation to a transmit mode of operation during a turnaround time (e.g., the default 192 µs duration), and transmit an acknowledgement and a MLE child ID request. The MLE child ID request may be used as part of the process to establish a parent-child relationship between the first node 150 and the second node 152. In the MLE child ID request, the second node 152 may include data (e.g., capability or configuration data) indicating that the second node 152 is capable of operating with a reduced turnaround time.

The first node 150 may receive the MLE parent response and data at its receiver, switch from a receive mode of operation to a transmit mode of operation during a turnaround time (e.g., the default 192 µs duration), and transmit an MLE child ID response to the second node (e.g., to provide the second node with a child ID). Additionally, because both nodes 150, 152 have each sent an indication that they support a reduced turnaround time and received an indication from the other node that the other node supports a reduced turnaround time, the first node 150 and the second node 152 may operate with a reduced turnaround time. For example, the first node 150 and the second node 152 may have a "fastACK" feature that enables the first node 150 and the second node 152 to operate with the reduced turnaround time. After the first node 150 and the second node 152 have configured themselves to operate with the reduced turnaround time, the first node 150 and the second node 152 may exchange data (e.g., payload data) with one another and operate with the reduced turnaround time.

In some embodiments, this technique may be vendor specific. For example, electronic devices made or sold by a particular company may be able to perform the technique discussed above with respect to FIG. 8 when communicating with other devices made or sold by the same vendor. Additionally, in one embodiment, the indication that one node provides to another to indicate that the node supports a reduced turnaround time may be indicative of the reduced turnaround time.

Figure 10:
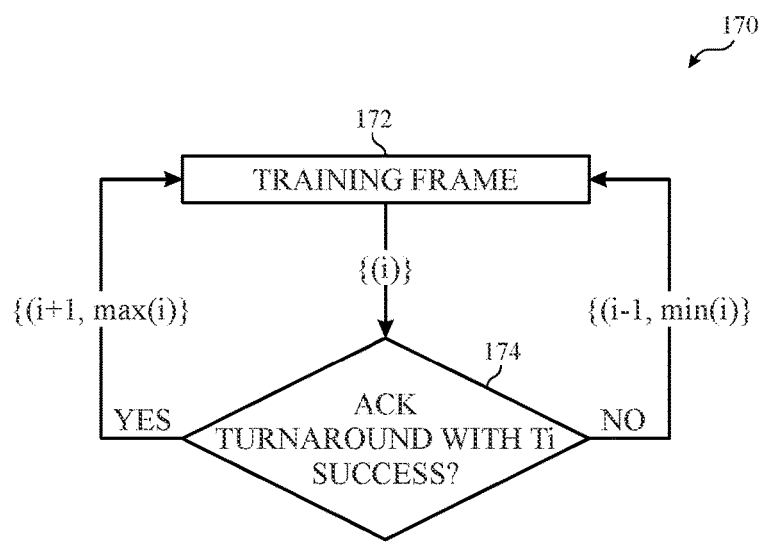
FIG. 10 is a flow diagram of a process for adjusting a turnaround time of a node, according to embodiments of the present disclosure.
Figure 11:
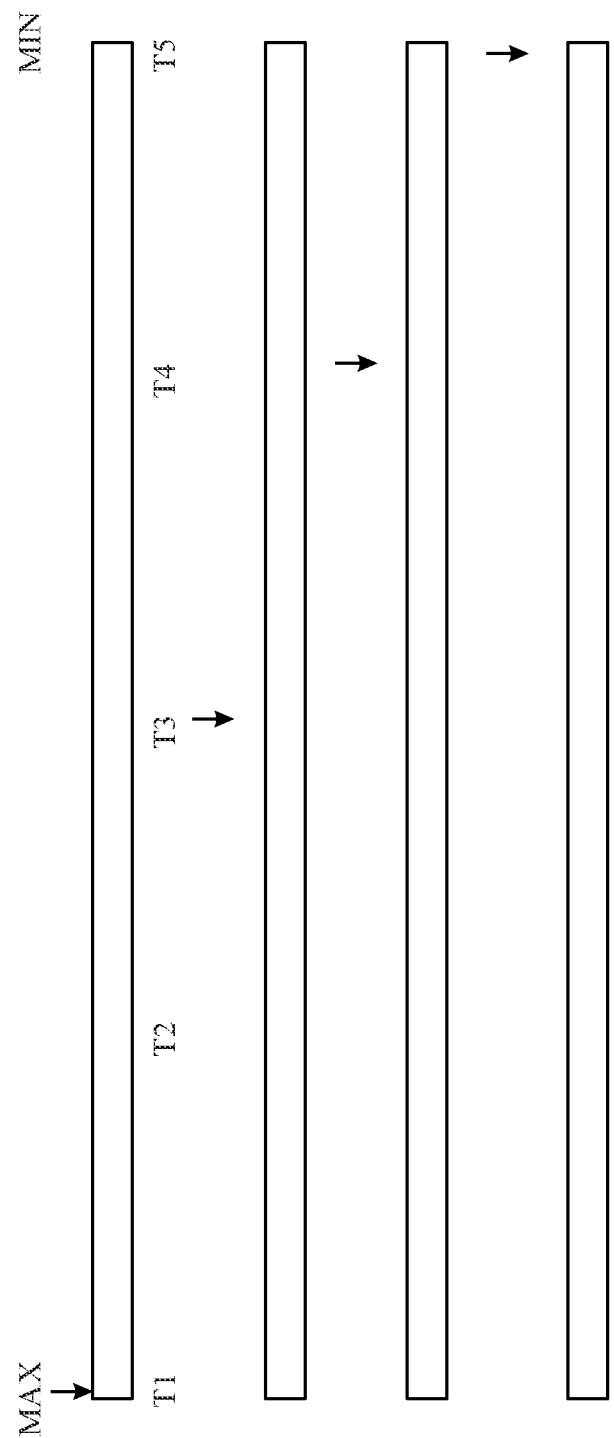
FIG. 11 is a timing diagram of intervals or timings that may be used as turnaround time durations, according to embodiments of the present disclosure.

Another technique that may be utilized to decrease the turnaround time for electronic devices is described below with respect to FIGS. 9-11. This technique, which may be referred to as "learning-based turnaround estimation," generally involves using training frames of data so that each node can dynamically learn other nodes' capability for turnaround times (e.g., reduced turnaround times). The nodes may then utilize an adjusted turnaround time, which may be the shortest turnaround time that each of the nodes is capable of supporting. Learning-based turnaround estimation may be utilized with devices made or sold by the same vendor as well as devices that are made or sold by different vendors.

Figure 9:
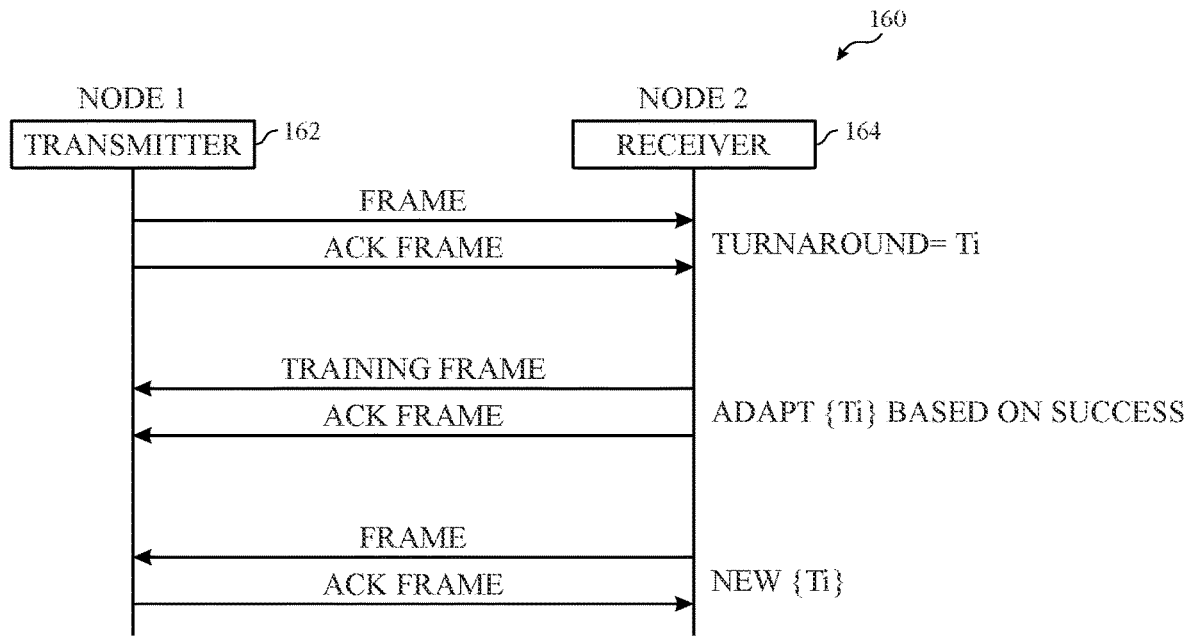
FIG. 9 is a timing diagram of two nodes of the wireless network of FIG. 5 performing learning-based turnaround estimation, according to embodiments of the present disclosure.

Keeping this in mind, FIG. 9 is a timing diagram 160 of communication operations between a first node 162 and a second node 164 in which learning-based turnaround estimation is used. In general, the first node 162 may transmit data to the second node 164. The transmitted data, which may include several frames of data (e.g., sample data), may include training frames that the first node 162 may utilize to estimate an optimal (e.g., maximally reduced) turnaround time for the second node 164. In general, the training frames may be utilized to incrementally determine a reduced turnaround time that the second node 164 is capable of using. For instance, FIG. 10 is a flow diagram 170 of a process that the first node 162 may perform in order to estimate a turnaround time for the second node 164. As illustrated in process block 172, the first node 162 may transmit one or more training frames associated with a first turnaround time, $T_i$, and determine whether the second node performs a turnaround (to send an acknowledgement) successfully within the first turnaround time. The first turnaround time may correspond to $T_1$ in FIG. 11, which is a maximum duration of turnaround time used. For example, $T_1$ may be 128 μs or another amount of time (e.g., less than 128 μs). If the first node 162 detects that the second node 164 successfully performs a turnaround within the first turnaround time, the first node 162 may send one or more additional training frames associated with a second turnaround time (e.g., $T_{i+1}$, which could be $T_2$ in FIG. 11) that has a shorter duration than the first turnaround time and determine (at decision block 174) whether the second node 164 performs a turnaround within the second turnaround time.

The first node 162 may continue to send training frames associated with shorter and shorter turnaround times until the second node 164 does not perform a turnaround within the turnaround time being evaluated, in which case the first node 162 may estimate that the turnaround time for the second node 164 is a previously tested successful turnaround time (e.g., the last or most recent previously tested successful turnaround time). For example, with reference to FIG. 11, if the second node 164 can perform a turnaround within the duration of $T_3$, the second node 164 is evaluated for $T_4$. If the second node 164 cannot perform a turnaround in such an amount of time, then the first node 162 may determine that $T_3$ is the turnaround time that should be used when communicating with the second node 164. If the first turnaround time that is evaluated proves to be unsuccessful, the first node 162 may evaluate turnaround times increasing in duration until a successful turnaround time is found. In such a case, the first successful turnaround time may be used as the adjusted (or reduced) turnaround time.

While learning-based turnaround estimation is described above as using increments of one (e.g., with respect to testing $T_1$ then $T_2$, etc.), the increments may differ in other embodiments. For example, in another embodiment, a binary search (e.g., or any other suitable search algorithm) over the increments may be implemented. That is, the steps may be 50% increments between a starting duration of the turnaround time and a second duration associated with another turnaround time (e.g., evaluating $T_1$ then $T_3$ then $T_4$ then $T_5$ (as indicated in the arrows of FIG. 11) or evaluating $T_4$ after starting with $T_3$ and determining the second node 164 cannot perform a turnaround in the duration associated with $T_3$). Furthermore, while FIG. 11 shows the spectrum of a maximum turnaround to minimum turnaround time having five increments (e.g., $T_1$-$T_5$, or turnaround times that can be evaluated) that can be evaluated, fewer than five increments or more than five increments may be used in other embodiments (e.g., two, three, four, six, seven, eight, nine, or ten increments). Furthermore, it should also be noted that because the turnaround time is hardware-specific, once a turnaround time has been determined for a node (e.g., at manufacturing of the electronic device 10), the learning-based turnaround estimation may not be performed again (e.g., at runtime of the electronic device 10). Rather, the turnaround time may be saved and utilized for future communication with the node.

Returning briefly to FIG. 6, before discussing collision avoidance techniques involving performing multiple clear channel assessments, it should be noted that an alternative technique to reducing the turnaround time is to increase the duration of the clear channel assessment 116. For example, the duration of the clear channel assessment 116 could be increased to be equal to the unreduced turnaround time 114 (e.g., 192 μs). By doing so, the data collision illustrated in FIG. 6 would also be avoided because the clear channel assessment 116 would indicate that the channel is not idle.

Data Collision Avoidance Using Multiple Clear Channel Assessments

Figures 12, 13:
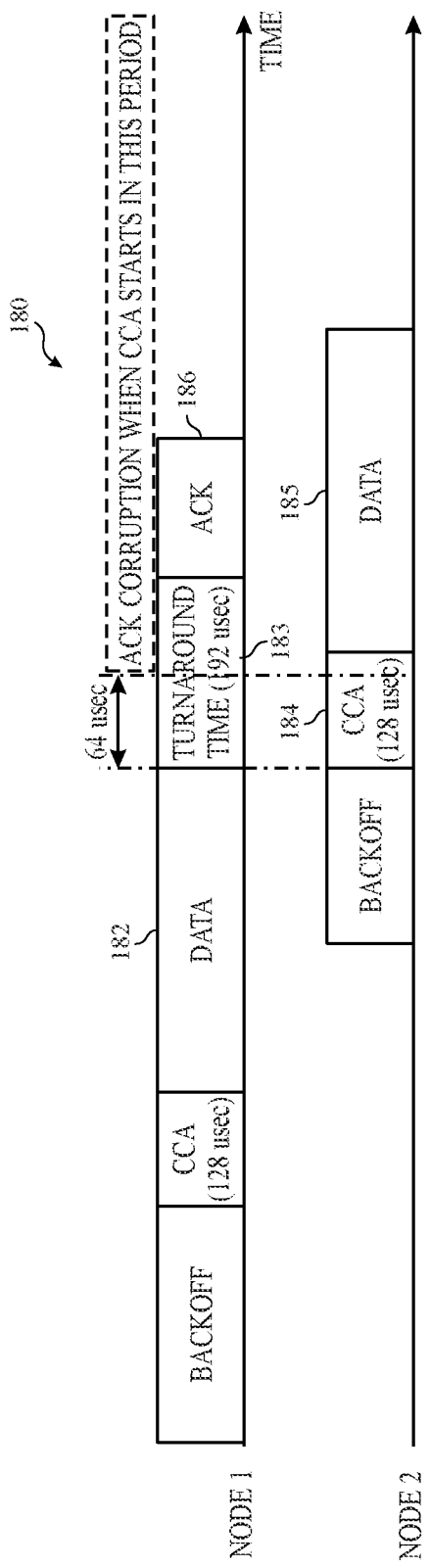
FIG. 12 is a timing diagram depicting actions taken by two nodes of the wireless network of FIG. 5 over time that result in a data collision, according to embodiments of the present disclosure.
FIG. 13 is a timing diagram for a node in the wireless network of FIG. 5 performing multiple clear channel assessments, according to embodiments of the present disclosure.

As described below, the occurrence of data collisions may also be reduced or eliminated by performing multiple clear channel assessments. With this in mind, FIG. 12 is a timing diagram 180 depicting actions taken by two nodes (e.g., nodes within the wireless network 100) over time that results in a data collision. As indicated by "Data" 182 associated with "Node 1", the receiver of the first node receives data and, during a turnaround time 183, switches from operating in a receive mode to operating in a transmit mode (e.g., by deactivating the receiving and activating the transmitter). As described above, the turnaround time 183 may be a defined duration of time, such as 192 μs as defined by IEEE Standard 802.15.4. During the turnaround time 183, the second node performs a clear channel assessment 184 for a channel of the wireless network 100, which indicates that the channel is idle, meaning the channel is available to be used to transmit data. The second node begins transmitting data (as indicated by "Data" 185 associated with "Node 2") during the turnaround time. However, while the second node is transmitting data, the turnaround time ends, and the transmitter of the first node begins to transmit an acknowledgement 186. Thus, a data collision occurs because the first and second nodes are simultaneously transmitting data (e.g., on the same channel).

To reduce or eliminate the occurrence of data collisions, multiple clear channel assessments may be performed. More specifically, one or more clear channel assessments may be performed during a backoff period, an additional clear channel assessment (e.g., the clear channel assessment typically performed in accordance with IEEE Standard 802.15.4) be performed after the backoff period ends, and data may be transmitted when the additional clear channel assessment indicates that the channel is clear. For example, FIG. 13 is a timing diagram 190 for a node (e.g., electronic device 10) in the wireless network 100 in which the node performs a clear channel assessment 192 during backoff period 194. More specifically, the node performs the clear channel assessment 192 during the last 128 µs of the backoff period 194 because the duration of the clear channel assessment 192 is 128 µs. If the clear channel assessment 192 indicates that the channel is busy, the node may determine there is a channel access failure and go into a retransmission phase (e.g., enter another backoff period). If the clear channel assessment indicates that the channel is idle, the backoff period 194 ends and an additional (e.g., a second) clear channel assessment 196 is performed. If the second clear channel assessment 196 indicates that the channel is busy, then the node may determine there is a channel access failure and enter a transmission phase (e.g., enter another backoff period). If the second clear channel assessment 196 indicates that the channel is idle, then the node transmits data (as indicated by "Data" 198). Because several clear channel assessments in which the channel is found to be idle are performed, it is less likely that the node will transmit data while another node is transmitting data on the same channel. Thus, by performing multiple clear channel assessments, the occurrence of data collisions may be reduced or eliminated.

Figure 14:
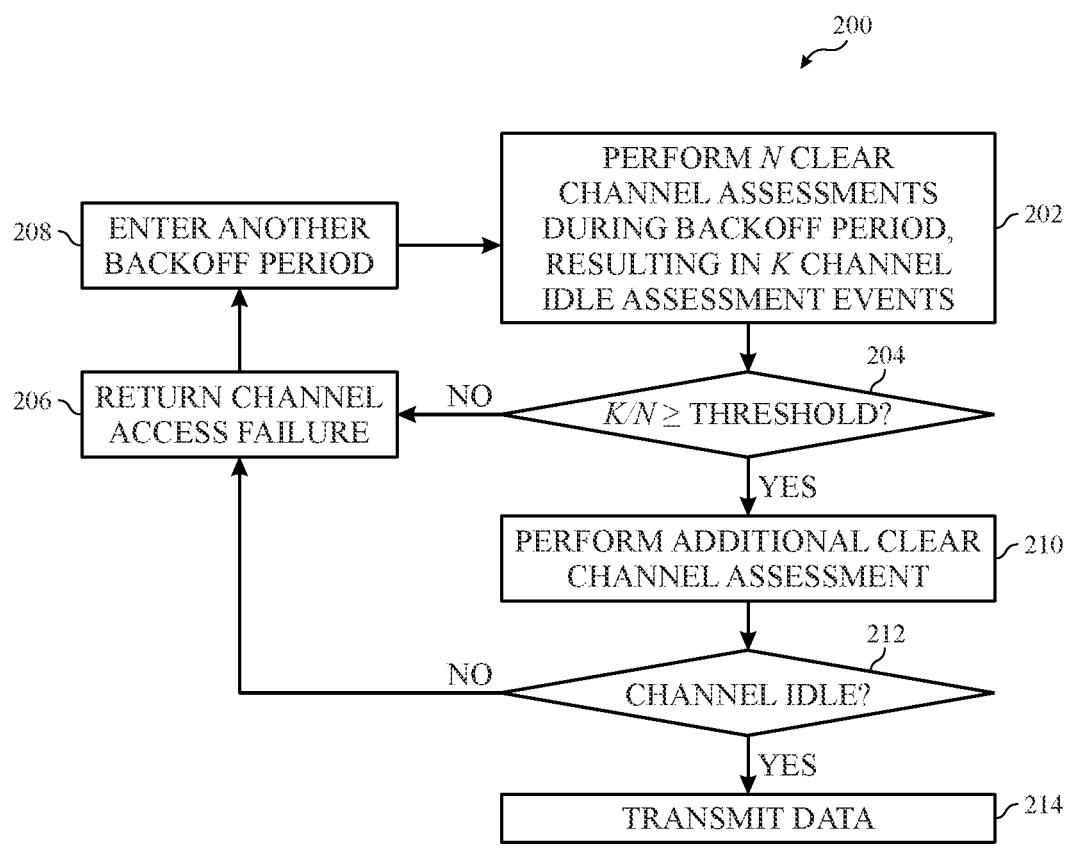
FIG. 14 is a flow diagram of a process for transmitting data in which performance of an additional clear channel assessment is based on a comparison of a ratio of channel idle assessment events to clear channel assessments performed during a backoff period to a threshold, according to embodiments of the present disclosure.

Continuing with the drawings, FIG. 14 is a flow diagram of a process 200 for transmitting data in which performance of the additional clear channel assessment may be based on a comparison of a ratio of channel idle assessment events to clear channel assessments performed during a backoff period to a threshold. Any suitable device (e.g., a controller) that may control software components of the electronic device 10, such as the processor 12 or the transceiver 30, may perform the process 200. In some embodiments, the process 200 may be implemented by executing instructions stored in a tangible, non-transitory, computer-readable medium, such as the memory 14 or storage 16, using the processor 12 or transceiver 30. For example, the process 200 may be performed at least in part by one or more software components, such as an operating system of the electronic device 10, one or more software applications of the electronic device 10, and the like. While the process 200 is described using steps in a specific sequence, it should be understood that the present disclosure contemplates that the described steps may be performed in different sequences than the sequence illustrated, and certain described steps may be skipped or not performed altogether.

In process block 202, the processor 12 (or transceiver 30 or transmitter 52) performs N clear channel assessments during a backoff period, where N is an integer value greater than zero. For example, one, two, three, or more than three clear channel assessments may be performed. The N clear channel assessments will result in K channel idle assessment events, where K is an integer value equal to or greater than zero (and less than or equal to N). In other words, K is the number of times the channel is assessed as being idle. The value of N may be a fixed value or may be a variable number that the processor 12, transceiver 30, or transmitter 52 may select. Additionally, the first backoff may be performed at a time of N×$D_{CCA}$ before the backoff period ends, where $D_{CCA}$ is equal to the duration of the clear channel assessment (e.g., 128 µs). Each subsequent backoff period (in cases in which N is greater than one) may be performed immediately after the duration of the preceding clear channel assessment expires.

In decision block 204, the processor 12 (or transceiver 30 or transmitter 52) determines whether the ratio of K to N is greater than or equal to a threshold value. The threshold value may be a predefined value, and there may be one (or more) threshold(s) associated with each value of N. For example, in the case of N=1, the threshold value may be one (i.e., 100%), while, in the case of N=3, the threshold value may be two-thirds (i.e., approximately 66.67%) or one. The values of the thresholds may be stored in a look-up table that is accessible to the processor 12, transceiver 30, transmitter 52, or a combination thereof.

In response to determining that the ratio of K to N is less than the threshold value, in process block 206, the processor 12 (or transceiver 30 or transmitter 52) returns a channel access failure and, in process block 208, causes the transceiver 30 (or transmitter 52) to enter another backoff period. After entering the other backoff period, the process 200 may return to process block 202, and one or more clear channel assessments may be performed as described above with respect to process block 202.

However, if at decision block 204 the ratio of K to N is greater than or equal to the threshold value, in process block 210, the processor 12 (or transceiver 30 or transmitter 52) may cause an additional clear channel assessment to be performed. More specifically, the backoff period may end (or be terminated), and the additional clear channel assessment may be the clear channel assessment that is performed after the backoff period ends (e.g., in accordance with IEEE Standard 802.15.4).

In decision block 212, the processor 12 (or transceiver 30 or transmitter 52) determines whether the channel is idle. In other words, the processor 12 (or transceiver 30 or transmitter 52) evaluates whether the additional clear channel assessment is indicative of the channel being available for data transmission. If in decision block 212 the channel is determined to be busy (i.e., not idle), the process 200 may progress to process block 206 and process block 208 as described above. However, if in decision block 212 the channel is determined to be idle, in process block 214, the processor 12 (or transceiver 30 or transmitter 52) causes the transmitter 52 to transmit data. In this manner, the process 200 enables the occurrence of data collisions to be reduced or eliminated.

The techniques described herein with respect to performing multiple clear channel assessments may be combined with the techniques described above with respect to reducing turnaround times. For example, multiple clear channel assessments may be performed while using a turnaround time that is less than 128 µs.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. An electronic device comprising:
   a transceiver configured to:
      communicatively couple to a second electronic device via an IEEE Standard 802.15.4 wireless network;
      receive first capability data from the second electronic device; and
      transmit second capability data to the second electronic device; and
   processing circuitry configured to:
      perform a clear channel assessment (CCA) having a first duration;
      set a turnaround time to a second duration that is less than or equal to the first duration based upon the first capability data being indicative of the second electronic device being capable of operating using a second turnaround time that has a third duration that is less than or equal to the first duration; and
      switch the transceiver from a receive mode of operation to a transmit mode of operation during the turnaround time having the second duration.

2. The electronic device of claim 1, wherein the second duration is less than the first duration.

3. The electronic device of claim 1, wherein the transceiver comprises:
   a receiver configured to receive data from the second electronic device; and
   a transmitter configured to transmit an acknowledgement to the second electronic device after the turnaround time has expired.

4. The electronic device of claim 3, wherein:
   the transmitter is configured to send first training data to the second electronic device;
   after sending the first training data, the processing circuitry is configured determine whether the receiver receives a second acknowledgement from the second electronic device indicative of the second electronic device having the second turnaround time having the third duration; and
   in response to receiving the second acknowledgement that is indicative of the second electronic device having the second turnaround time having the third duration, the processing circuitry is configured to set the turnaround time to be the second duration.

5. The electronic device of claim 1, comprising a computing device, a tablet, a phone, a wearable electronic device, a speaker, home automation equipment, a router, a network extender, or power equipment.

6. A computer-implemented method, comprising:
   performing, by processing circuitry of an electronic device, a plurality of first clear channel assessments (CCAs) for a wireless communication channel during a backoff period, wherein the plurality of first CCAs comprises a first number of CCAs and the first plurality of CCAs results in a second number of channel idle assessment events corresponding to the wireless communication channel being idle;
   in response to a ratio of the second number to the first number being equal to or greater than a threshold, performing, by the processing circuitry, a second CCA; and
   in response to the second CCA being indicative of the wireless communication channel being idle, transmitting, by a transmitter of the electronic device, data, or configuring, by the processing circuitry, a receiver of the electronic device to receive data.

7. The computer-implemented method of claim 6, wherein the second CCA is defined by IEEE Standard 802.15.4.

8. The computer-implemented method of claim 6, wherein the second CCA is performed after the backoff period expires.

9. The computer-implemented method of claim 6, wherein the wireless communication channel is a communication channel of an IEEE Standard 802.15.4 wireless network.

10. The computer-implemented method of claim 6, wherein:
    the first plurality of CCAs comprises a final CCA having a first duration; and
    performing, by the processing circuitry, the first plurality of CCAs comprises starting, by the processing circuitry, to perform the final CCA at a time that is the first duration before an end of the backoff period.

11. The computer-implemented method of claim 6, wherein the threshold is determined based on the first number.

12. The computer-implemented method of claim 6, wherein the electronic device comprises a computing device, a tablet, a phone, a wearable electronic device, a speaker, home automation equipment, a router, a network extender, or power equipment.

13. A non-transitory computer-readable medium comprising instructions that, when executed by at least one processor of an electronic device, cause the at least one processor to:
   cause a transceiver of the electronic device to be configured to receive first capability data from a second electronic device;
   perform a clear channel assessment (CCA) having a first duration on an IEEE Standard 802.15.4 wireless network;
   set a turnaround time to a second duration that is less than or equal to the first duration based upon the first capability data being indicative of the second electronic device being capable of operating using a second turnaround time that has a third duration that is less than or equal to the first duration; and
   cause the transceiver to switch from a receive mode of operation to a transmit mode of operation within the turnaround time having the second duration.

14. The non-transitory computer-readable medium of claim 13, wherein the second duration is less than the first duration.

15. The non-transitory computer-readable medium of claim 13, wherein the instructions, when executed, cause the at least one processor to cause a transmitter of the transceiver to transmit an acknowledgement to the second electronic device after the turnaround time has expired.

16. The non-transitory computer-readable medium of claim 15, wherein the instructions, when executed, cause the at least one processor to cause the transmitter to transmit second capability data to the second electronic device.

17. The non-transitory computer-readable medium of claim 16, wherein prior to causing the turnaround time to be set to the second duration, the instructions, when executed, cause the at least one processor to cause the transceiver to operate within a third turnaround time having a fourth duration that is greater than the first duration.

18. The non-transitory computer-readable medium of claim 15, wherein the instructions, when executed, cause the at least one processor to:
    cause the transmitter to send first training data to the second electronic device;
    after sending the first training data, determine whether a receiver of the transceiver receives a second acknowledgement from the second electronic device indicative of the second electronic device having the second turnaround time having the third duration; and
    in response to the receiver receiving the second acknowledgement that is indicative of the second electronic device having the second turnaround time having the third duration, set the turnaround time to be the second duration.

19. The non-transitory computer-readable medium of claim 18, wherein the third duration is greater than the second duration.

20. The non-transitory computer-readable medium of claim 13, wherein the IEEE Standard 802.15.4 wireless network comprises a Thread network.

* * * * *